(12) United States Patent
Nakayama

(10) Patent No.: US 7,274,727 B2
(45) Date of Patent: Sep. 25, 2007

(54) CIRCUIT FOR DETECTING A SHIFTED FREQUENCY, A METHOD FOR DETECTING A SHIFTED FREQUENCY AND PORTABLE COMMUNICATION APPARATUS

(75) Inventor: Takashi Nakayama, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 749 days.

(21) Appl. No.: 10/696,055

(22) Filed: Oct. 29, 2003

(65) Prior Publication Data

US 2004/0091026 A1   May 13, 2004

(30) Foreign Application Priority Data

Oct. 31, 2002   (JP)   ............ P2002-316929

(51) Int. Cl.
   H04B 1/69   (2006.01)
   H04B 1/707  (2006.01)
   H04B 1/713  (2006.01)

(52) U.S. Cl. ............... 375/148; 375/144; 375/347; 375/349

(58) Field of Classification Search ......... 375/148, 375/147, 150, 144, 142, 347, 349; 455/504, 455/506, 137, 132
See application file for complete search history.

(56) References Cited

U.S. PATENT DOCUMENTS 6,658,045 B1 * 12/2003 Jin ............... 375/147

6,704,552 B1   3/2004 Matsumoto
7,054,352 B2 * 5/2006 Hasegawa ............ 375/147
2004/0013169 A1 * 1/2004 Kanemoto et al. ........ 375/147

FOREIGN PATENT DOCUMENTS

JP   2001 86031   3/2001
WO   WO 01 59937  8/2001

OTHER PUBLICATIONS

Li Yan et al "Automatic frequency correction scheme for spread spectrum coherent RAKE receiver" Apr. 30, 1998, Electronics Letters, IEE Stevenage, GB, pp. 844-845, XP006009687 ISSN: 0013-5194.

* cited by examiner

*Primary Examiner*—Phuong Phu
(74) *Attorney, Agent, or Firm*—Formmer Lawrence & Haug LLP; William S. Frommer; Paul A. Levy

(57) ABSTRACT

A Doppler frequency is detected with a high degree of accuracy, deterioration of a transmission diversity effect is prevented, and a good reception property is secured. A reception demodulating unit of a portable communication apparatus according to the present invention has a path search and path selection unit for searching and selecting an optimum path, finger processing units for obtaining a phase variation component as a channel estimated value for each path and coherent-detecting by using its channel estimated value and a phase difference measuring unit for measuring a phase difference, a path timing difference measuring unit for measuring a periodical path timing difference, a frequency error detecting unit for detecting a frequency error of a signal by using a path timing difference and a phase difference, and a Doppler frequency detecting unit for detecting a Doppler frequency on the basis of a frequency error.

32 Claims, 7 Drawing Sheets

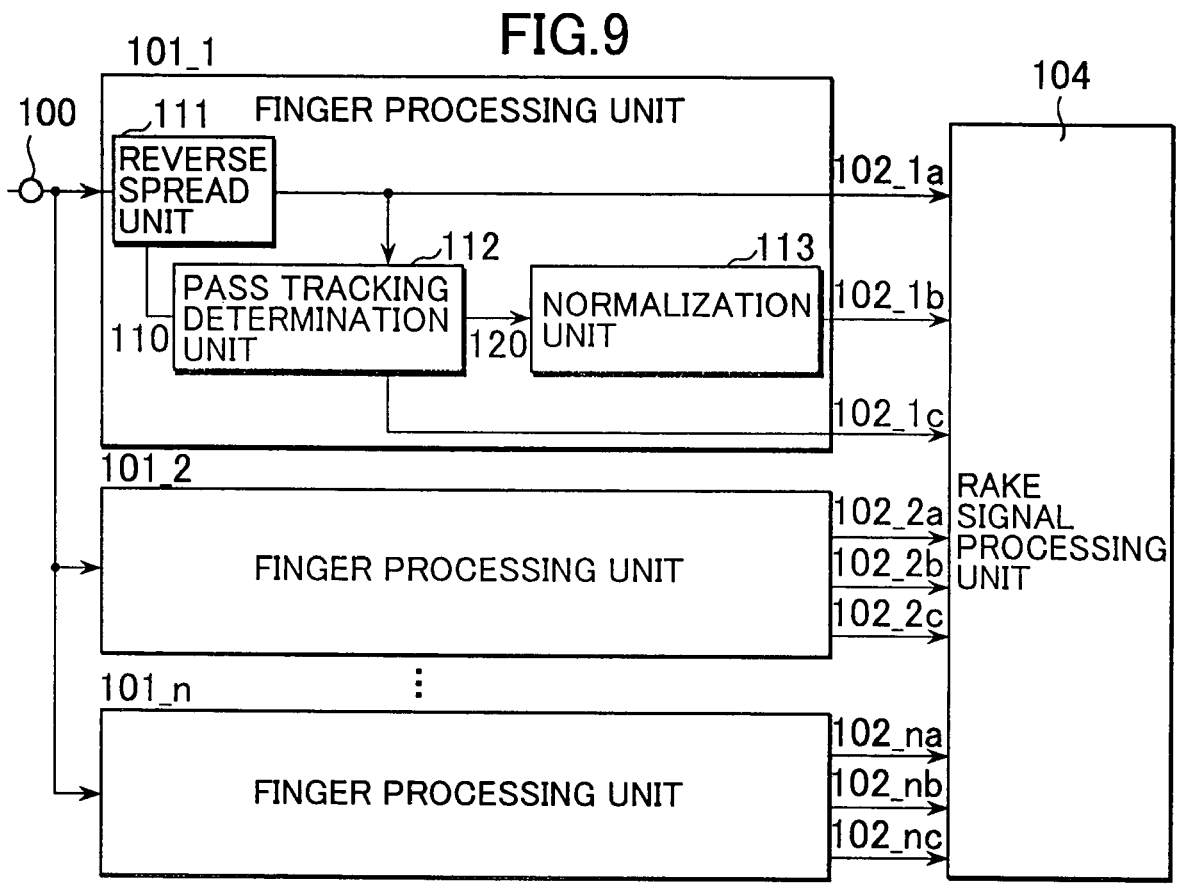
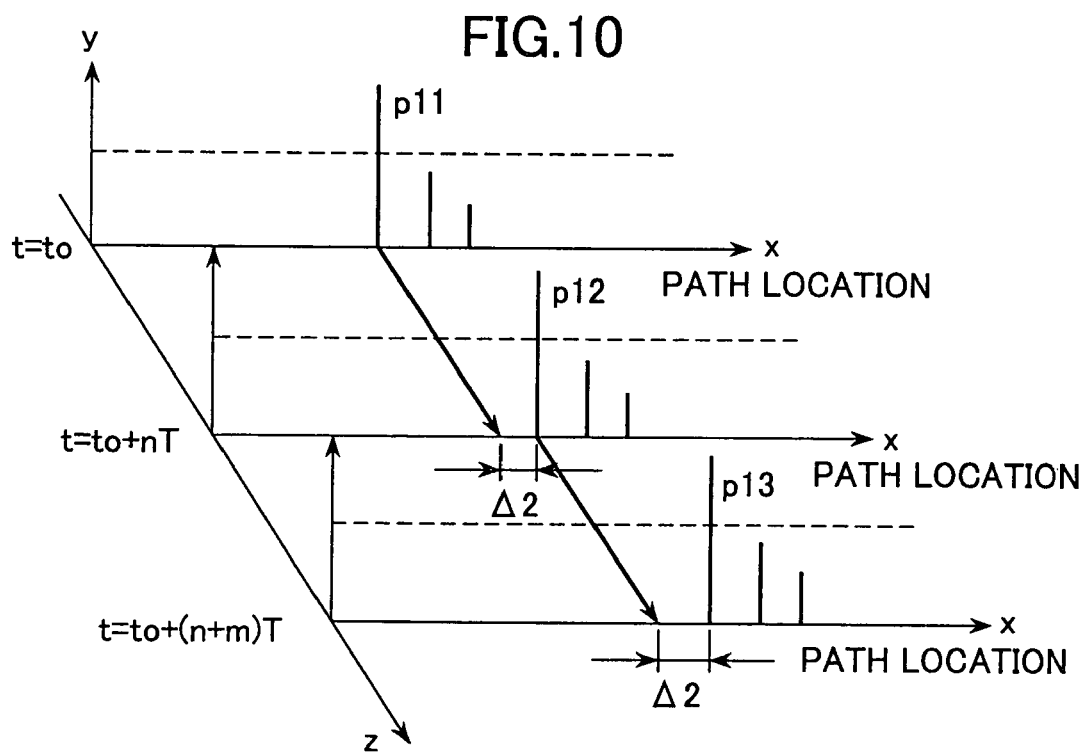

CIRCUIT FOR DETECTING A SHIFTED FREQUENCY, A METHOD FOR DETECTING A SHIFTED FREQUENCY AND PORTABLE COMMUNICATION APPARATUS

CROSS REFERENCES TO RELATED APPLICATIONS

The present document is based on Japanese Priority Document JP 2002-316929, filed in the Japanese Patent Office on Oct. 31, 2002, the entire contents of which being incorporated herein by reference.

BACKGROUND OF THE INVENTION

1. Field of the Invention

The present invention relates to a portable communication apparatus system (a mobile communication terminal) employing, for example, a direct spread-code division multiple access (hereinafter, referred to as DS-CDMA system), a circuit for detecting a shifted frequency and a method for detecting a shifted frequency, which are suitable for the DS-CDMA system.

2. Description of Related Art

According to a CDMA (Code Division Multiple Access) communication system employing a spectrum spread communication technology, a transmission side spreads a signal to be transmitted in a larger band using a spread code upon transmission. On the other hand, a reception side restores the original signal by performing reverse spread using the spread code identical to the spread code of the transmission side. This communication system is characterized by being strong in multipath fading, capable of speeding up of a data rate, its good communication quality and a high frequency usability or the like. Thus, in a next generation mobile communication system, a DS-CDMA system (a direct spread-code division multiple access, a W-CDMA system) of a development system of the CDMA communication system is employed as a wireless access system in IMT-2000.

Currently, this DS-CDMA system is standardized in 3GPP (3rd Generation Partnership Project) and application of transmission diversity is determined in its specification. It is difficult for a mobile station side to have a smaller circuit, make electric current consumption lower, make a cost lower and realize miniaturization while using an effect of space diversity sufficiently. Accordingly, in the 3GPP, in order to solve this problem, instead of allowing a space diversity reception at the mobile station side, transmission diversity for transmitting a signal by using a plurality of antennas at a base station side is employed. Depending on this transmission diversity, without complicating a structure of the mobile station side, it is possible to improve a reception property of downlink.

The above-described transmission diversity has following two systems, namely, an open loop transmission diversity for transmitting a signal from a plurality of antennas in a predetermined order pattern and a closed loop transmission diversity for transmitting a signal from a plurality of antennas after weighting at the base station side on the basis of feedback information transmitted from the mobile station side.

The closed loop transmission diversity has an effect on improvement of the reception property owing to its principle upon moving at a low speed, namely, in a case that a Doppler frequency is small. On the other hand, it is known that the reception property of this closed loop transmission diversity is deteriorated because of reception error of the feedback information and delay of tracking with respect to variation of a propagation path property at the base station upon moving at a high speed, namely, in a case that the Doppler frequency is large. Therefore, it is important for improving the reception property to detect a current Doppler frequency at the mobile station side and to judge whether or not the closed loop transmission diversity should be carried out in accordance with its size. Further, the deterioration of the reception property when the Doppler frequency is large is described in detail in a non-patent document 1 or the like.

In this case, as a method of detecting the Doppler frequency, in a patent document 1, a technique to estimate a fading pitch, namely, an inverse number of the Doppler frequency by obtaining an average time when a level of the received signal at the mobile station becomes a threshold or less is disclosed. In addition, in a patent document 2, a technology to estimate the Doppler frequency of the mobile station with respect to the base station by using a tracking correction value along with a path acquisition tracking operation is disclosed.

FIG. 9 shows a block diagram that is described in the patent document 2. In addition, FIG. 10 shows a relation between acquisition at finger processing units 101-1, 101-2, . . . , 101-n, a reverse spread value with respect to a path to be tracked, a location of a received path, and a time lapse.

The finger processing units 101-1, 101-2, . . . , 101-n shown in FIG. 9 have the same structures, respectively. In this case, taking the finger processing unit 101-1 as a typical example, the structure of the finger processing units will be described below. The finger processing unit 101-1 is made up with a reverse spreading unit 111, a path tracking determination unit 112 and a normalization unit 113. The reverse spreading unit 111 may perform a reverse spread processing for a signal that is received by the mobile station to output a reverse spread result signal 102-1a and a tracking correction value 110. The tracking correction value 110 is transmitted to the path tracking determination unit 112, and the reverse spread result signal 102-1a may be transmitted to the path tracking determination unit 112 and a RAKE signal processing unit 104 in a later stage. The path tracking determination unit 112 may determine whether or not the path can be correctly tracked using the reverse spread result signal 102-1a and the tracking correction value 110. Then, if the path can be correctly tracked, the path tracking determination unit 112 may output difference information 120 with respect to a path location before a given time together with a weighting factor 102-1c. The above-mentioned difference information 120 is transmitted to the normalization unit 113, and the weighting factor 102-1c is transmitted to the RAKE signal processing unit 104. The normalization unit 113 may obtain and output path location variable speed information 102-1b by using the above-mentioned difference information 120.

On the other hand, the RAKE signal processing unit 104 may perform RAKE combining by using respective reverse spread result signals 102-1a to 102-na that are outputted from respective finger processing units 101-1 to 101-n and at the same time, the RAKE signal processing unit 104 may estimate a relative speed to the base station by using the weighting factors 102-1c to 1-2-nc and the path location variable speed information 102-1b to 102-nb.

In FIG. 10, a vertical axis (y axis) shows a reverse spread value to a path to be acquired and tracked by the finger processing unit, a horizontal axis (x axis) shows a location of the received path, and a depth axis (z axis) shows lapse of a time t. At the above-mentioned path tracking determination unit 112, it will be determined whether or not the path can be correctly tracked starting from t=t0, the next determination will be performed after nT hours, and then, the further next determination will be performed after (n+m) T hours.

In this example shown in FIG. 10, it is depicted that, at any one finger processing unit, a path p11 is allocated at t=t0, the path 11 is changed into a path p12 at t=t0+nT, and the path p12 is changed into a path p13 at t=t0+(n+m)T. In addition, in the example shown in FIG. 10, it is depicted that the difference information indicating a path variation amount between t=t0 to t=t0+nT is Δ1 and the difference information indicating a path variation amount between t=t0+nT to t=t0+(n+m)T is Δ2.

Generally, a following equation (1) represents a relation between a frequency error Δf and a phase difference Δϕ, so that, by calculating Δ1/nT and Δ2/mT, it is possible to estimate the frequency error, namely, a relative movement speed between the base station and the mobile station.

$$\Delta f \cdot t = \Delta \phi \quad (1)$$

In this case, a broken line in FIG. 10 represents a threshold level for determining whether or not the path is correctly tracked by the path tracking determination unit 112. In a case that the reverse spread level after the above-mentioned reverse spread processing is set less than this threshold value, the path tracking determination unit 112 may judge that the path is not correctly tracked and it may consider that there is no difference information at this point.

According to the above description, in a technique described in the above-described patent document 2, by measuring a delay profile of the path of the received signal and by using the difference information of a path timing that is periodically measured with respect to the path having a level, of which reverse spread value is set at a threshold or more, the relative movement speed represented by the frequency error is estimated.

[Non-Patent Document 1]
"Result of Outdoor Experiment of Feedback Type Transmission Diversity in W-CDMA Downlink" written by Akira FUKUMOTO, Kenichi HIGUCHI, Hashie SAWA, and Fumiyuki ADACHI, Technical Research Paper of The Institute of Electronics, Information and Communication Engineers, RCS99-156 (1999 November)
[Patent Document 1]
JP-A-2001-285129 (FIG. 5)
[Patent Document 2]
JP-A-2001-298395 (FIGS. 1 and 2)

However, when actually using a detection circuit and a method for detecting the Doppler frequency according to the above described conventional example to judge whether or not the closed loop transmission diversity operation should be carried out in the mobile communication system in the DS-CDMA system, there are some problems as follows.

As described above, in the DS-CDMA system, in an effort to secure speeding up of a data rate and a high communication quality even under an environment of a low reception level, the application of the transmission diversity is decided. On the contrary, the environment of the low reception level is assumed for judgment whether or not the closed loop transmission diversity operation should be carried out.

On the other hand, the technique described in the above-described patent document 1 requires an average time that a level of the received signal is set at the threshold and less. Therefore, a fading pitch estimation unit for estimating a period of level drop of the received signal is added as a circuit, and this results in a large circuit size of a receiver. In addition, under a communication environment where the level of the received signal is low, because of influence of noise, the Doppler frequency cannot be measured with a high degree of accuracy.

In addition, according to the technique described in the above-described patent document 2, as described above, a delay profile of each path of the received signal is measured and by using the difference information of a path timing that is periodically measured, with respect to a path having a reverse spread value with a level not less than the threshold, a relative moving speed is estimated. However, there may be no path having a reverse spread value with a level not less than the threshold, in a communication environment with a low reception level, or in a multipath propagation environment, and in this case, it is not possible to measure the Doppler frequency with a high degree of accuracy.

Further, as obvious from the equation (1), since the difference information may also include an amount corresponding to the difference information of the path timing derived from a carrier offset frequency error between the base station and the mobile station, it is not possible to measure the Doppler frequency with a high degree of accuracy leaving the system as it is.

SUMMARY OF THE INVENTION

The present invention has been made taking the foregoing problems into consideration and provides a portable communication apparatus, a circuit for detecting a shifted frequency and a method for detecting a shifted frequency capable of detecting a current Doppler frequency with a high degree of accuracy, preventing deterioration of a transmission diversity effect, and securing a good reception property, for example, even under a communication environment where the level of a received signal is low or a multipath environment in the DS-CDMA system mobile communication system. In addition, the present invention provides a portable communication apparatus, a circuit for detecting a shifted frequency and a method for detecting a shifted frequency capable of detecting a current Doppler frequency with a high degree of accuracy, preventing deterioration of a transmission diversity effect, and securing a good reception property without newly adding a complex structure for detecting the Doppler frequency.

A circuit for detecting a shifted frequency according to the present invention may include a path selection unit for measuring a delay profile of a spread signal that has passed through a plurality of paths and searching and selecting an optimum path; a plurality of finger processing units for reverse spreading a spread signal of each path, obtaining a channel estimated value with respect to each path, and carrying out coherent detection; a phase difference measuring unit for measuring a phase difference from a phase variation component of each channel estimated value; a path timing difference measuring unit for measuring a periodical path timing difference depending on the delay profile; a frequency error detecting unit for detecting a frequency error of the signal by using the path timing difference and the phase difference; and a Doppler frequency detecting unit for detecting a Doppler frequency on the basis of the frequency error.

A method for detecting a shifted frequency according to the present invention may include measuring a delay profile of a spread signal that has passed through a plurality of paths and searching and selecting an optimum path; reverse spreading a spread signal of each path, and obtaining a channel estimated value with respect to this path by using a given pilot symbol; carrying out finger processing to perform coherent detection; measuring a phase difference from a phase variation component of each channel estimated value obtained by each finger processing; measuring a periodical path timing difference depending on the delay profile; detecting a frequency error of the signal by using the path timing difference and the phase difference; and detecting a Doppler frequency on the basis of the frequency error.

A portable communication apparatus according to the present invention may include a circuit for detecting a shifted frequency having a path selection unit for measuring a delay profile of a received signal that has passed through a plurality of paths and searching and selecting an optimum path; a plurality of finger processing units for reverse spreading a spread signal of each path, obtaining a channel estimated value with respect to this path by using a given pilot symbol to carry out coherent detection; a phase difference measuring unit for measuring a phase difference from a phase variation component of each channel estimated value; a path timing difference measuring unit for measuring a periodical path timing difference by the delay profile; a frequency error detecting unit for detecting a frequency error of the signal by using the path timing difference and the phase difference; a Doppler frequency detecting unit for detecting a Doppler frequency on the basis of the frequency error; and a transmission and reception circuit for transmitting and receiving a signal that is spread by a spread code to and from a base station.

A portable communication apparatus according to the present invention may include a transmitting and receiving unit for transmitting and receiving a signal that is spread by a spread code to and from a base station; a control unit for controlling a transmission and reception property of the transmitting and receiving unit; a control information generating unit for generating control information to be used for at least an uplink control channel; a Doppler frequency detecting unit for detecting a Doppler frequency of a received signal; and a determination unit for determining whether or not a closed loop transmission diversity should be carried out in accordance with the detected Doppler frequency. Further, the control information generating unit may notify the base station side of information corresponding to the determination result by inserting the information into the uplink control channel; the control unit may optimally control a reception property of the transmitting and receiving unit in response to a reply from the base station corresponding to the notification.

In other words, according to the present invention, since a frequency error of a signal is detected by using a phase difference that is obtained from each phase variation component of each path and a path timing difference that is obtained from a delay profile and the Doppler frequency is detected on the basis of its frequency error, for example, even under a communication environment having a low signal level and a multipath environment, it is possible to detect the current Doppler frequency with a high degree of accuracy. In addition, according to the present invention, since the current Doppler frequency is detected at a mobile communication terminal, the value itself of this Doppler frequency or the information representing whether or not the closed loop transmission diversity should be carried out is reported to the base station side, and the reception property is optimally controlled in response to a reply from the base station side in accordance with this report, it is possible to obtain a good reception property.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 9 is a view for showing schematic structures of a conventional finger processing unit and a conventional RAKE signal processing unit; and FIG. 10 is a view for showing a relation between a location of a path, of which a reverse spread value is received with respect to a path to be acquired and tracked by a conventional finger processing unit, and a time lapse.

DESCRIPTION OF THE PREFERRED EMBODIMENTS

The embodiments of the present invention will be described with reference to the drawings below.

Figure 1:
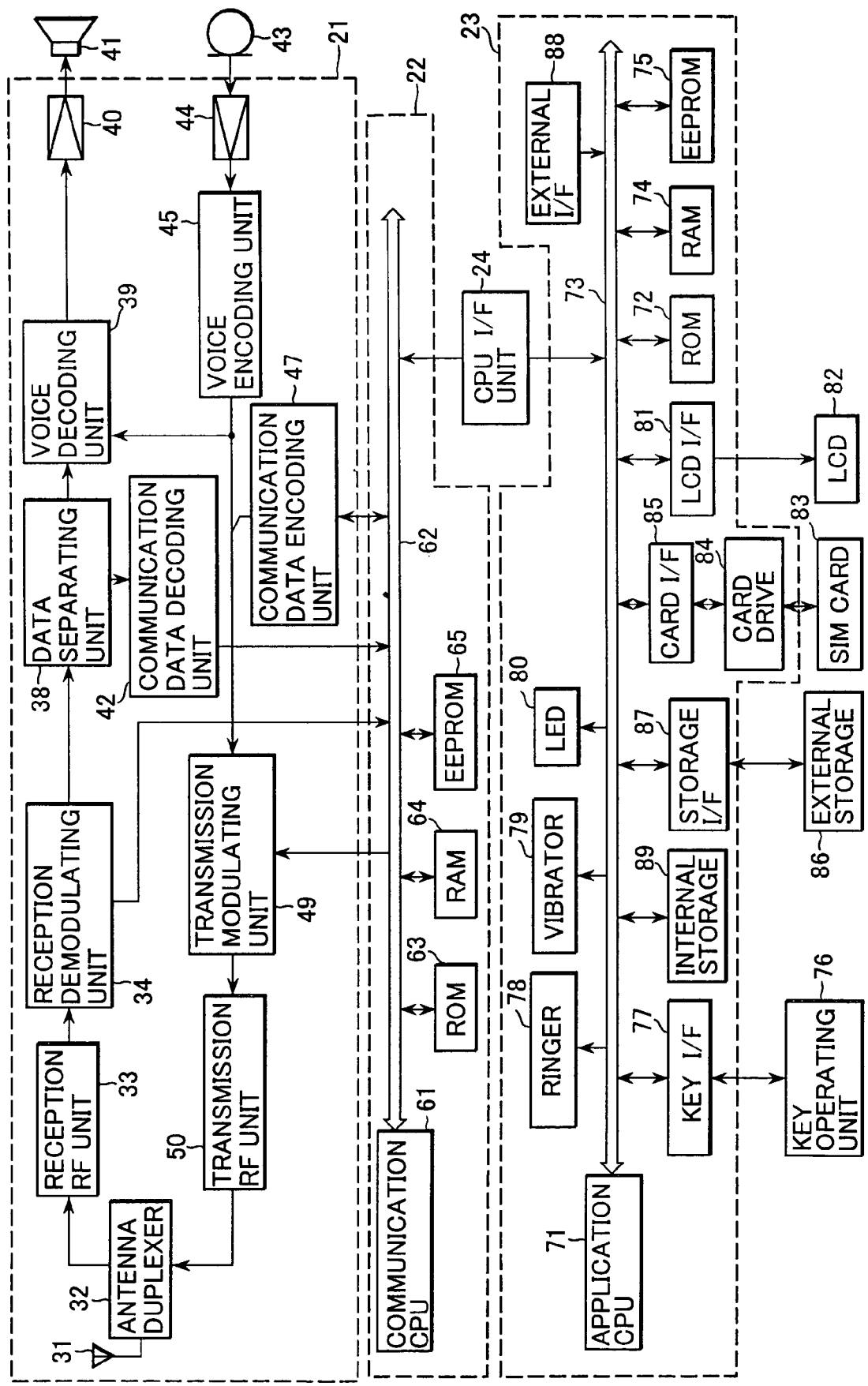
FIG. 1 is a block diagram for showing an internal structure of a portable telephone according to the present invention.

FIG. 1 shows a schematic structure of a portable telephone in a DS-CDMA system as an embodiment of a portable communication apparatus according to the present invention. Further, the portable communication apparatus according to the present invention may be not only a portable telephone but also a mobile communication terminal such as a car navigation apparatus provided with a communication function in the DS-CDMA system and a PDA apparatus (Personal Digital Assistants) or the like.

As shown in FIG. 1, the portable telephone according to the present embodiment is provided with a transmitted/received signal processing unit 21, a communication processing unit 22, and an application control processing unit 23. The communication processing unit 22 and the application control processing unit 23 are connected with each other via a CPU interface unit 24 (CPU I/F unit). The above-mentioned communication processing unit 22 is provided with a communication CPU 61 for controlling the communication such as a telephone call or the like. The above-mentioned application control processing unit 23 is provided with an application CPU 71 for controlling various applications such as a display processing of a standby screen and a voice processing of a ring-tone melody or the like. Further, according to the present embodiment, an example is explained, in which different CPUs take charge of the processing at the communication processing unit 22 and the processing at the application control processing unit 23, respectively, however, one CPU may take charge of these processing or three and more CPUs may share these processing.

[Basic Operation Upon Receiving a Signal]

Receiving a radio wave from a base station (not illustrated) from a two-way antenna 31, the transmitted/received signal processing unit 21 may transmit the received signal to a reception RF unit 33 via an antenna duplexer 32. The reception RF unit 33 may carry out a processing such as low noise amplification of this received signal, down conversion of a high frequency received signal into a base band signal, and an orthogonal detection or the like. I and Q base band signals after the orthogonal detection are transmitted to a reception demodulating unit 34.

The detailed structure and operation will be described later, however, the reception demodulating unit 34 may perform finger processing including quantization processing of I and Q base band signals, reverse spread by a spread code replica, channel estimation by using a pilot symbol, and coherent detection by using this channel estimated value. In addition, this reception demodulating unit 34 may perform a RAKE combining processing of a signal after each finger processing and outputting of the received data after this RAKE combining to a data separating unit 38 or the like. Further, the reception demodulating unit 34 according to the present embodiment may perform processings including a phase difference measurement by using each of the above-mentioned channel estimated value, search and selection of an optimum path on the basis of the estimated value of an averaged delay profile, detection of a periodical path timing difference, frequency error detection by using the information of the phase difference and the path timing difference, averaging of the frequency error signals, and detection of a current Doppler frequency due to the frequency error signal after the averaging processing and the current frequency error signal or the like. Then, the value of the Doppler frequency that is detected from the above received signal at the reception demodulating unit 34 will be sent to a communication CPU 61 of the communication processing unit 22.

The data separating unit 38 determines classification of the received data, namely, if the received data is voice data or other communication data (for example, packet communication data) and separates the voice data and the communication data from the received data in accordance with this classification determination. Then, the data separating unit 38 may send the voice data to a voice decoding unit 39 and the communication data to a communication data decoding unit 42.

After performing decoding processings including an expansion processing of the voice data, a deinterleave processing, and an error correction processing or the like, the voice decoding unit 39 may perform D/A (digital/analog) conversion processing. The analog voice signal after this D/A conversion is amplified by an amplifier 40 and is supplied to a speaker 41, and this allows the received voice to be outputted via the speaker 41.

The communication data decoding unit 42 performs decoding processings including the expansion processing of the above-mentioned communication data, the deinterleave processing, and the error correction processing or the like and sends the obtained communication data to the communication processing unit 22. In addition, this communication data is also sent to the application control processing unit 23 according to need.

[Basic Operation Upon Transmitting a Signal]

On the other hand, an analog voice signal that is inputted via a microphone 43 is transmitted to a voice encoding unit 45 after adjusted into a given level by an amplifier 44. The voice encoding unit 45 may A/D (analog/digital) convert the voice signal, and further, the voice coding unit 45 may perform processings including a compression processing, an interleave processing and an addition processing of an error correction code or the like on the voice signal to send the obtained voice data to a transmission modulating unit 49.

In addition, the communication data inputted from the communication processing unit 22 will be sent to a communication data encoding unit 47. This communication data encoding unit 47 may perform processings including the compression processing, the interleave processing, and the addition processing of an error correction code or the like on the communication data to send the obtained communication data to the transmission modulating unit 49.

The transmission modulating unit 49 may perform the modulation processing with respect to the supplied voice data and communication data by the spread code and then, D/A converting the obtained I and Q base band signals, the transmission modulating unit 49 may send the D/A converted signals to a transmission RF unit 50.

After up-converting the above-mentioned I and Q base band signals to a transmission signal of a high frequency, the transmission RF unit 50 amplifies these signals and sends them to the antenna duplexer 32. The antenna duplexer 32 in this case may send the above-mentioned transmitted signal to the two-way antenna 31, and this allows the transmission signal to be transmitted from this antenna 31 as a radio wave.

[Structure of Communication Processing Unit and Basic Operation]

The communication CPU 61 of the communication processing unit 22 may control the above-described signal transmission/reception processing in the transmitted/received signal processing unit 21. Specifically, the communication CPU 61 will carry out various communication control processing in accordance with communication control software that is stored in a ROM (Read Only Memory) 63.

In addition, the communication CPU 61 may generate various control data for a common antenna and for an individual channel to be used for an uplink. Although the details thereof will be described later, particularly according to the present embodiment, the communication CPU 61 may also add the value of the Doppler frequency transmitted from the reception demodulating unit 34 of the transmitted/received signal processing unit 21 or the predetermined information that is generated on the basis of this Doppler frequency, for example, to the data for a dedicated control channel (DCCH) during uplink communication to report the value of the Doppler frequency or the certain information to the base station side.

Further, the communication CPU 61 is connected to the ROM 63, a RAM 64 (Random Access Memory), and an EEPROM 65 (Electrically Erasable and Programmable Read Only Memory). The RAM 64 is used as a work area of the communication CPU 61 and the RAM 64 may store the data or the like during calculation according to need during execution of software of the communication CPU 61 and may temporarily store the data to be exchanged between other respective units. The EEPROM 65 is an nonvolatile memory and even if a power source of the portable telephone is turned off, for example, the EEPROM 65 can keep stored the information of a communication setting condition just before. Accordingly, the communication CPU 61 can realize the setting just before that the power source is turned off by controlling the setting of each unit on the basis of the information that is stored in this EEPROM 65 when the power source is turned on in the next place.

In this way, the communication processing unit 22 may perform various communication control processings including a transmission and reception processing of a signal or the like by the above-mentioned communication control software.

[Structure and Basic Operation of Application Control Processing Unit]

The application control processing unit 23 executes applications such as a user interface control such as a key input or the like, a display processing of a standby screen and a voice processing of a ring-tone melody or the like. Specifically, the application CPU 71 may activate application software to be stored in a ROM 72 and control respective units that are connected with each other via an application bus line 73 so as to realize the above-described application function.

From among respective constituent elements that are connected to the above-mentioned application CPU 71 via the application bus line 73, a RAM 74 is used as a work area of the application CPU 71, and an EEPROM 75 stores a setting condition or the like of the application. In addition, the ROM 72 stores information for initializing the portable telephone, font data for displaying a character on a display unit 82 (LCD), sound sample data for obtaining a sound output through a ringer 78, and an oscillation pattern for operating a vibrator 79 or the like. An internal storage 89 is a rewritable storage media, in which, for example, the storage hold operation such as a flush memory or the like is not needed, and the internal storage 89 may store various data, for example, the above-mentioned various application software, a telephone directory data comprising the information such as a telephone number and an electronic mail address and names and appellations corresponding to these telephone number and electronics mail address, schedule data, communication history data of transmission and reception, and memo pad data or the like. Further, these data may be stored in the EEPROM 75. In addition, the internal storage 89 and the EEPROM 75 may be realized by not constituting separately but dividing a storage area in the same memory.

A key operating unit 76 may be composed of a button to be used for inputting a telephone number, an alphabet, a kana character and a mark or the like, a cursor operating element for moving a cursor on a screen, various keys and buttons to be operated by a user such as power-on and power-off or the like and a dial. In the portable telephone, if the user operates the key operating unit 76, a key I/F 77 will send its operation information to the application CPU 71. In this time, the application CPU 71 will carry out the application processing in accordance with the key operation.

In addition, the application CPU 71 may drive the ringer 78, the vibrator 79 and an LED (Light Emitting Diode) 80 to notify the user of calling or the application CPU 71 may control the display unit 82 to display a standby screen and various message or the like thereon via an LCD I/F 81.

In addition, for example, it is assumed that this portable telephone is provided with a card drive 84 capable of fitting a SIM (Subscriber Identity Module) card 83 and a storage I/F 87 capable of connecting an external storage 86. If the above-mentioned SIM card 83 is mounted on this card drive 84, the card drive 84 may read an individual ID such as a telephone number or the like of the user recorded in this SIM card 83 to supply it to the communication CPU 61 via the card I/F 85 and the CPU I/F unit 24. At this time, for example, the communication CPU 61 will certificate the user by these kinds of information. In addition, if the external storage 86 is connected to a storage I/F 87, the application CPU 71 will read a content recorded in this external storage 86 via the storage I/F 87. This information read from the external storage 86 is also supplied to the communication CPU 61 according to need. Further, the above-mentioned external storage 86 may be a semiconductor memory, for example, shaped in a stick or a card. This external storage 86 has a large volume, for example, and can store various application software and the data such as a standby screen, a ring-tone melody, and a font or the like. In addition, the communication CPU 61 and the application CPU 71 also can read the software that is stored in the external storage 86 to control rewriting of the existing software (version up, update). It is a matter of course that version up and update are deemed to be allowed in the portable telephone according to the present embodiment in accordance with the software received via the antenna 31 or downloaded via an external I/F 88.

[Detailed Structure and Detailed Operation of Reception Demodulating Unit]

In the next place, with reference to FIG. 2, the detailed structure and the detailed operation of the above-mentioned reception modulating unit 34 will be described. It will be mainly described how this reception modulating unit 34 will detect the Doppler frequency below. Further, FIG. 2 also shows the received RF unit 33 at a front stage of the reception modulating unit 34.

Figure 2:
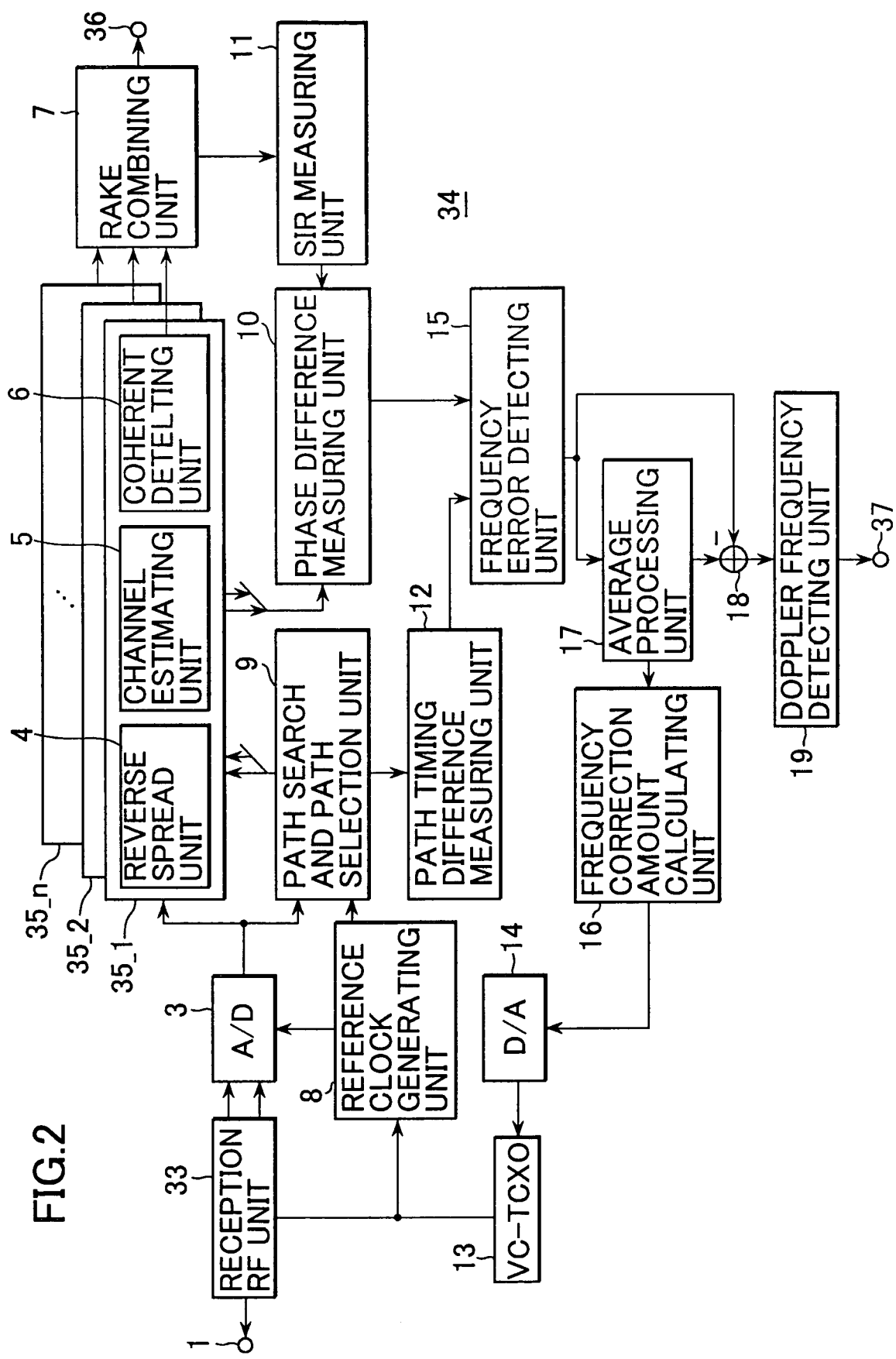
FIG. 2 is a block diagram for showing a detailed structure of a block diagram for showing a detailed structure of a reception demodulating unit.

In FIG. 2, a received signal is supplied to a terminal 1 from the antenna duplexer 32. The reception RF unit 33 amplifies the received signal, down converts the received signal in a RF band by a reference frequency signal from a VC-TCXO (voltage control-temperature compensated crystal oscillator) 13 into the above-mentioned base band signal, and further generates I and Q base band signals by an orthogonal detection. The I and Q base band signals outputted from the reception RF unit 33 are transmitted to an A/D converter 3 of the reception demodulating unit 34.

A reference clock generated by a reference clock generating unit 8 by using a reference frequency signal from the above-mentioned VC-TCXO 13 is supplied to this A/D converter 3 as a sampling clock. The A/D converter 3 samples the I and Q base band signals by the sampling clock and outputs a quantized digital signal. Further, it is deemed that the sampling frequency upon A/D conversion is normally over sampled with respect to a chip rate in order to improve a degree of accuracy. The received digital signal after the quantization is sent to finger processing units 35-1, 35-2, . . . , 35-n and a path search and path selection unit 9.

In this case, there are various physical channels in a downlink signal from the base station in the DS-CDMA system mobile communication system. In the 3 GPP, eleven downlink physical channels in total are defined such as a DPCH (Dedicated physical control channel), a SCH (Synchronization channel), a P-CPICH (Primary-Common pilot channel), a P-CCPCH (Primary-Common control physical channel) and a PICH (Paging indicator channel) or the like. Among these, the DPCH is a physical channel to be used actually when the user communicates, and the P-CPICH is used as a phase reference for each downlink physical channel and is always and regularly transmitted from the base station in all directions. In addition, there is one P-CPICH for one cell (sector), so that the P-CPICH serves as a physical channel to be used upon cell search.

Figure 3:
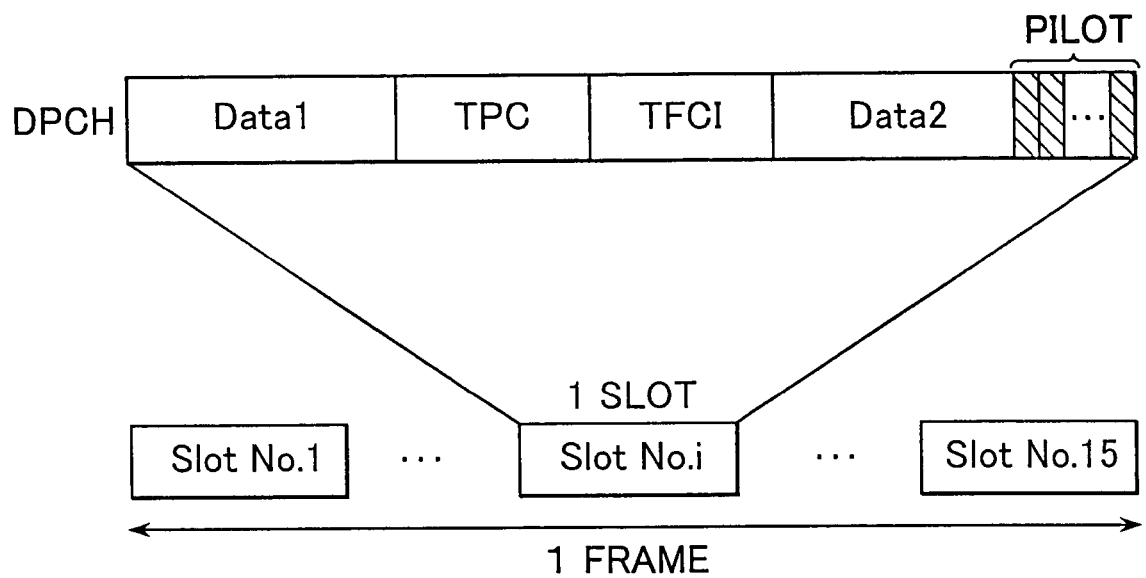
FIG. 3 is a view for showing details of a frame structure of a DPCH.
Figure 4:
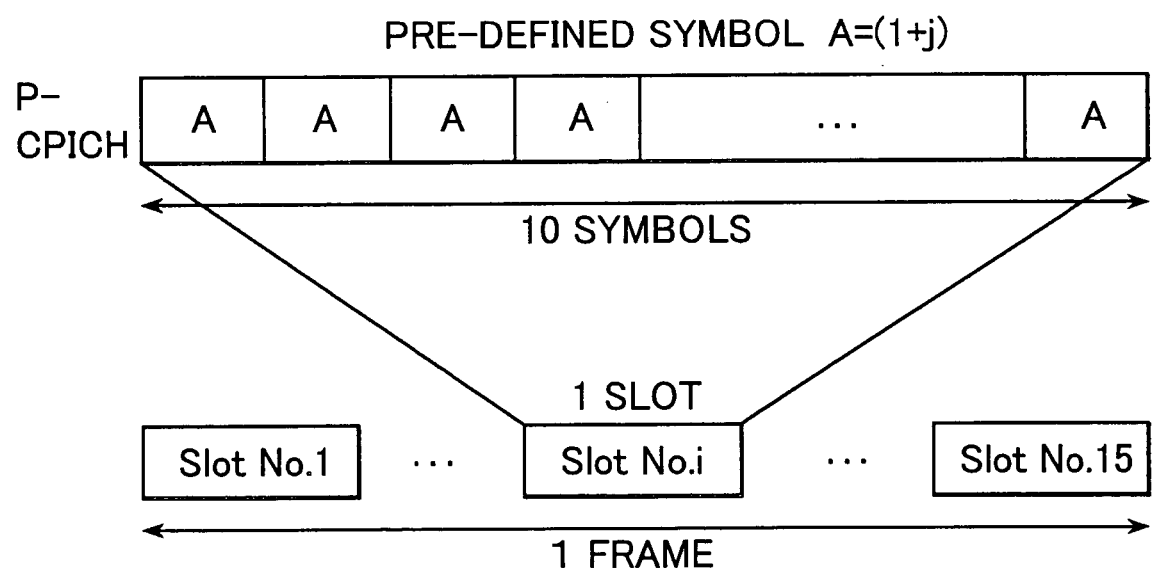
FIG. 4 is a view for showing details of a frame structure of a P-CPICH.

FIGS. 3 and 4 show details of a frame structure of a DPCH and a P-CPICH of a downlink. As shown in FIG. 3, in the DPCH of the downlink, one frame is composed of fifteen time slots (Slot No. 1 to Slot No. 15) and one time slot is composed of data (Data 1), a TPC (transmission power control command), a TFCI (Transport Format Combination Indicator), data (Data 2) and a pilot symbol (pilot). The pilot symbol (pilot) of the DPCH is a signal, of which modulation phase of the transmission data has been known in advance at the receiver side of the CDMA. In addition, within one time slot, at least one symbol to eight symbols at the maximum are to be applied. As shown in FIG. 4, in the P-CPICH, one frame is composed of fifteen time slots (Slot No. 1 to Slot No. 15) and one time slot is composed of the transmission data having predefined ten symbols A. The transmission data of this P-CPICH is also a signal, of which modulation phase has been determined in advance.

Returning to FIG. 2, the path search and path selection unit 9 measures the averaged delay profile by using the above-described quantized received signal to acquire synchronization of each path within the search range. In this case, since the received signal of each path, of which synchronization is acquired, includes interference of the other user and a thermal noise, the path search and path selection unit 9 eliminates the above-mentioned interference of the other user and the thermal noise by determining a threshold for a level of the received signal of each path, and then, the path search and path selection unit 9 selects the path in descending order of a level of the received signal. In addition, generally, under a land mobile communication environment, each path on the delay profile is temporally varied arising from Rayleigh fading, so that the path search and path selection unit 9 may average the level of the received signal of each path in order to eliminate the influence due to the temporary variation. Further, according to the present embodiment, in order to track the delay profile varying at a high speed and decrease the averaged time of the level of the received signal of each path, the path search and path selection unit 9 uses a matched filter, of which initial synchronization time of the diffused code is short. In addition, the path search and path selection unit 9 may use the P-CPICH as a physical channel to acquire synchronization. As described above, the P-CPICH is a phase difference reference of each downlink physical channel and the P-CPICH is always transmitted throughout a cell (sector) from the base station. Since this P-CPICH is transmitted by a power larger than that of the DPCH, which is generally used for the user communication, the path search and path selection unit 9 can acquire the path of the received signal with a high degree of accuracy. Further, in a case that the P-CPICH cannot be used, the path search and path selection unit 9 may use a S-CPICH instead of the P-CPICH. However, the S-CPICH is used when an upper layer (PRC protocol) notifies a terminal of this.

Figure 5:
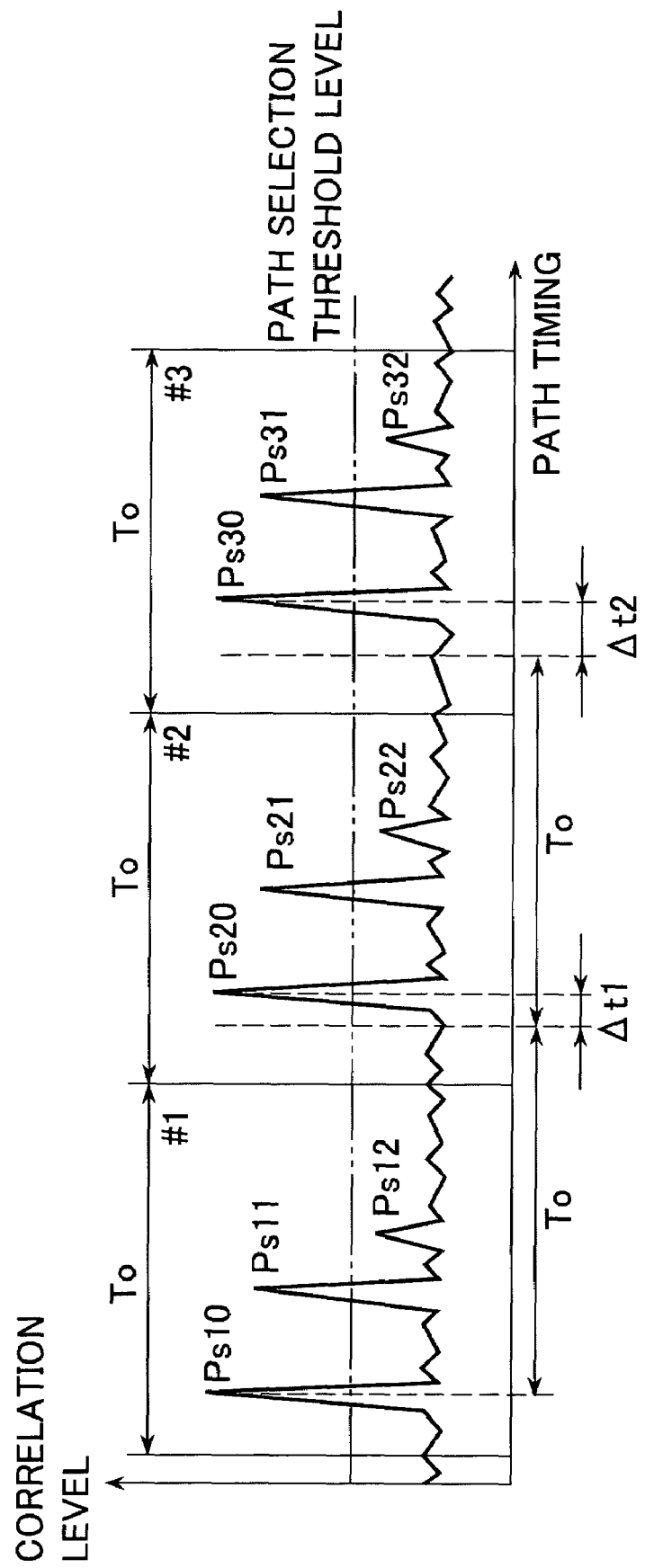
FIG. 5 is a view to be used for explaining an averaged delay profile measuring example in a path search and path selection unit.

FIG. 5 shows an averaged delay profile measurement example at the path search and path selection unit 9. In this case, in the drawing, a reference numeral T0 represents a path search range time, each waveform of #1, #2, and #3 is an averaged delay profile that is averaged by an averaged time, in which the path searcher output can be arbitrarily set. Focusing attention on the largest paths ps10 and ps20 among the paths whose levels are larger than the path selection threshold levels, in the averaged delay profiles #1 to #2, its timing difference is $\Delta t1$. Similarly, focusing attention on the largest paths ps20 and ps30 among the paths whose levels are larger than the path selection threshold value in the averaged delay profiles #2 to #3, its timing difference is $\Delta t2$. Accordingly, by using the above-described equation (1), if $\Delta t1/NT$ and $\Delta t2/2 \cdot NT$ are calculated, the frequency error, namely, the relative moving speed can be estimated. However, NT represents a delayed profile averaged time.

Next, the averaged delay profile information that is measured by the path search and path selection unit 9 is transmitted to a path timing difference measuring unit 12 and allocation information of the path, of which synchronization is acquired and which is selected, is transmitted to finger processing units 35-1 to 35-n.

The path timing difference measuring unit 12 may generate the path timing difference information from a reference clock from the above-described averaged delay profile information and the reference clock generating unit 8. In this case, this path timing difference measuring unit 12 generates the path timing difference information according to a method to obtain the timing difference between the largest paths from among the pathswhose levels of the received signals are larger than the path selection threshold levels and a method to obtain the timing difference between respective paths corresponding to the received signal amplitudes of respective paths having the received signal levels larger than the path selection threshold levels and to synthesize the information of each timing difference in the maximum ratio. Further, according to the present embodiment, since the path timing difference measuring unit 12 generates the above-described path timing difference information by using the averaged delay profile information that is obtained by the path search and path selection unit 9 of an essential function as a receiver in the DS-CDMA system, the size of the path timing difference measuring unit 12 is not increased from the aspect of a circuit and control.

Further, since the received signal of the acquired each path includes interference of the other user and the thermal noise, the path timing difference measuring unit 12 according to the present embodiment may weight this path timing difference information by adding reliability information corresponding to the signal amplitude of the received signal of the above-mentioned path to the above-mentioned measured each path timing difference information. This weighted each path timing difference information will be sent to a frequency error detecting unit 15.

On the other hand, the paths that are acquired and selected by the above-described path search and path selection unit 9 are allocated to the finger processing units 35-1, 35-2, . . . , 35-n, respectively. These respective finger processing units 35-1, 35-2, . . . , 35-n have the same structures, respectively. In this case, taking the finger processing unit 35-1 as a typical example, the structure of the finger processing units will be described below. The finger processing unit 35-1 is made up with a reverse spread unit 4, a channel estimating unit 5 and a coherent detecting unit 6. The reverse spread unit 4 reverse-spreads the above-mentioned received signal after quantization using each chip timing at the path search and path selection unit 9 in accordance with a spread code replica of the DPCH during communication to the current base station by using each chip timing at the path search and path selection unit 9. The reverse spread received signal of the DPCH is sent to the channel estimating unit 5. The channel estimating unit 5 will perform channel estimation by using the pilot symbol of the downlink DPCH as shown in FIG. 3. The channel estimation means to estimate a fading complex envelope curve of the received signal arising from fading variation of each path. In other words, in order to perform absolute synchronization detection, a variation of a phase and amplitude of the received signal arising from the fading variation of each path, namely, the fading complex envelope curve should be estimated, so that the channel estimating unit 5 may estimate the fading complex envelope curve. In specific, the channel estimating unit 5 defines a reception phase and amplitude of the pilot symbol of the above-mentioned downlink DPCH whose transmission data modulation phase has been known in advance, as the reference phase and amplitude so as to obtain a channel estimated value representing an amount corresponding to an amplitude and a phase variation arising from fading. The channel estimated value obtained by the channel estimating unit 5 and the above-described received signal after reverse spread will be sent to the coherent detecting unit 6. In addition, the channel estimated value is also sent to a phase difference measuring unit 10. The coherent detecting unit 6 compensates an amount corresponding to the phase variation of the received signal by multiplying the received signal for each symbol by a complex conjugate of the above-described channel estimated value. The received signal outputted from this coherent detecting unit 6 after the above-mentioned phase variation compensation will be sent to a RAKE combining unit 7.

The RAKE combining unit 7 combines a received signal of the downlink DPCH that is outputted from respective finger processing units 35-1 to 35-n in the maximum ratio. The received signal from this RAKE combining unit 7 is sent to the data separating unit 38 shown in FIG. 1 via a terminal 36, and at the same time, this received signal is also sent to a SIR (Signal-to-Interference Ratio) measuring unit 11.

The SIR measuring unit 11 measures SIR by using the downlink DPCH received signal that is combines by the above-mentioned RAKE combining unit 7 in the maximum ratio to generate the reliability information corresponding to the SIR. This reliability information will be sent to the phase difference measuring unit 10.

The phase difference measuring unit 10 measures the phase difference of the received signal by using the phase variation information of the channel estimated value sent from the channel estimating unit 5. In this case, according to the present embodiment, the phase difference measuring unit 10 may obtain the phase difference information using the phase variation information obtained from each pilot symbol within the slot and the phase difference information using the phase variation information obtained from each pilot symbol group between the slots. Since these phase difference information are measured by using the channel estimated value using the pilot symbol of the downlink DPCH that is used for the current user communication, it can be said that these phase difference information are in line with the current conditions. Further, as the phase variation information of the channel estimated value to be used upon obtaining the above-mentioned phase difference, for example, the phase difference measuring unit 10 can use only the phase variation information from the finger processing unit, to which the path (for example, the path having the maximum signal amplitude) whose received signal level is larger than the path selection threshold level, is allocated, or the phase difference measuring unit 10 can use the phase variation information that is obtained by combining the phase variation information of each finger processing unit in response to the received signal amplitude of each path, which is allocated to each finger processing unit by the path search and path selection unit.

Figure 6:
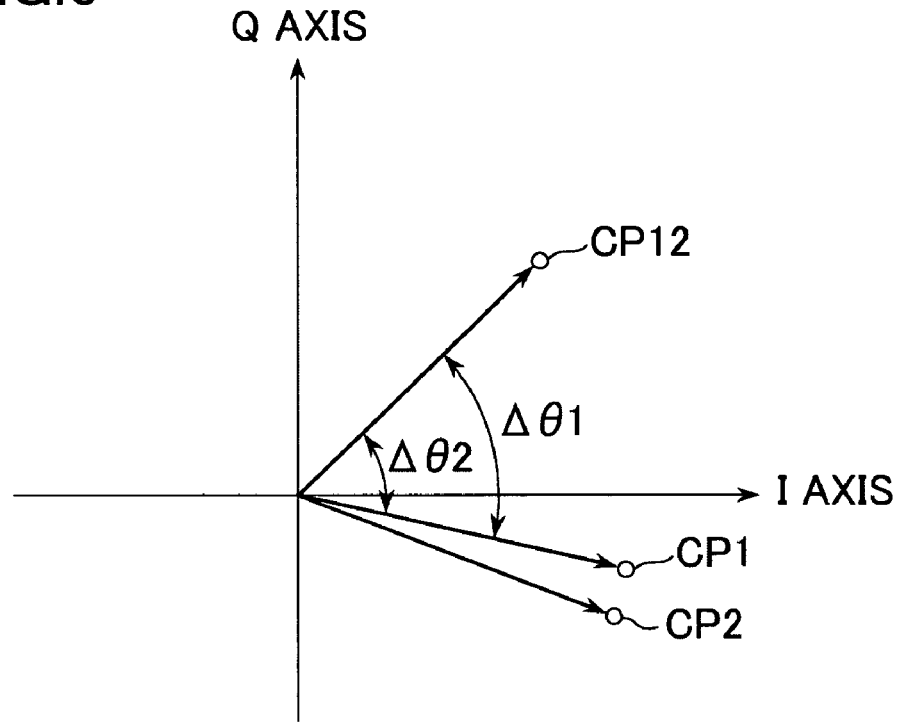
FIG. 6 is a view to be used for explaining phase variation information of a channel estimated value between pilot symbols within a slot.
Figure 7:
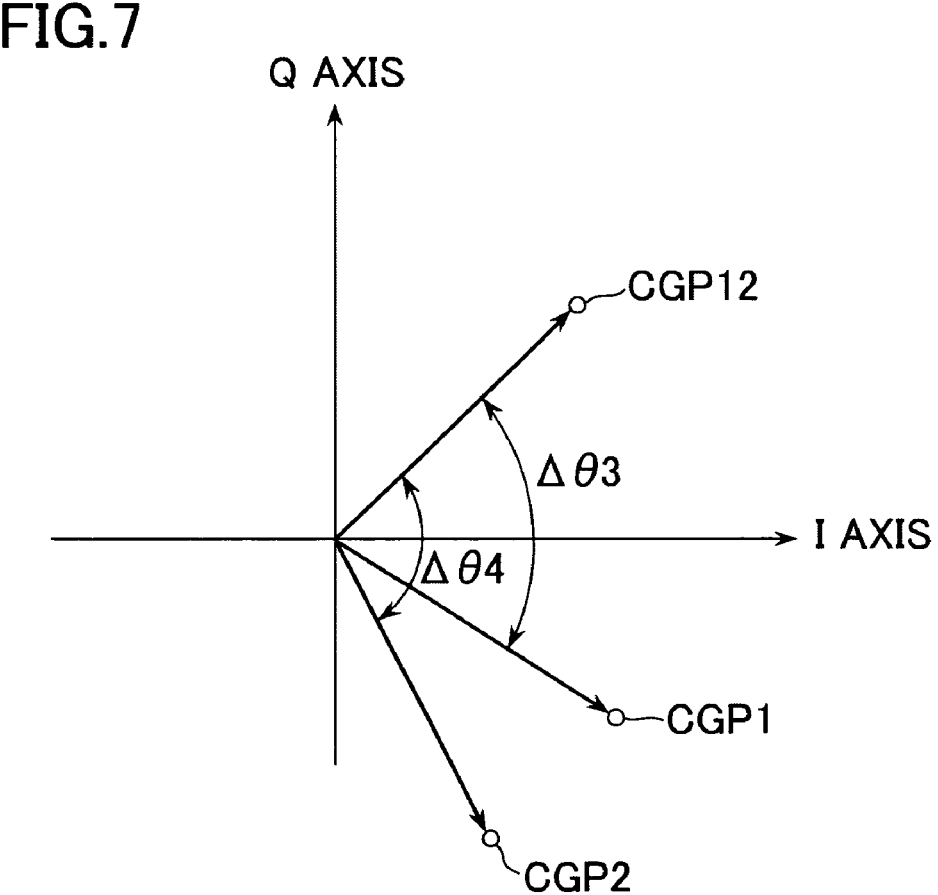
FIG. 7 is a view to be used for explaining phase variation information of a channel estimated value between pilot symbol groups within respective slots.

Assuming that a pilot symbol of the downlink DPCH is made of, for example, two symbols (referred to as a first pilot symbol and a second pilot symbol), a specific example in which the above-described phase difference measuring unit 10 obtains the phase difference information by using the phase variation information from among the pilot symbol groups between each pilot symbol within the above-mentioned slot and the slot will be explained with reference to FIGS. 6 and 7.

At first, with reference to FIG. 6, by using the phase variation information obtained from each pilot symbol within the slot, an example in which the above-described phase difference measuring unit 10 obtains the phase difference information will be described below. In FIG. 6, providing that normal coordinate positions CP12 of the first and second pilot symbols within the slot are defined in a first quadrant together, an amount corresponding to the phase variation between the coordinate position CP1 of the received first pilot symbol and the normal coordinate position CP12, namely, the phase variation information of the channel estimated value that is obtained from the first pilot symbol is $\Delta\theta1$, and an amount corresponding to the phase variation between the coordinate position CP2 of the received second pilot symbol and the normal coordinate position CP12, namely, the phase variation information of the channel estimated value that is obtained from the second pilot symbol is $\Delta\theta2$. Accordingly, as a result, an absolute value of the phase difference between the first and second pilot symbols within the slot is $|\Delta\theta1-\Delta\theta2|$ and a code of the phase difference represents negative. Thus, the phase difference measuring unit 10 may obtain the phase difference information of the channel estimated value that is obtained from each pilot symbol within the slot.

Next, with reference to FIG. 7, by using the phase variation information obtained from the first and second pilot symbols between the slots, an example in which the above-described phase difference measuring unit 10 obtains the phase difference information will be explained below. In FIG. 7, providing that normal coordinate positions CGP12 of the first and second pilot symbol groups between the slots are defined in a first quadrant together, the phase variation information between the coordinate position CGP1 of the received first pilot symbol group and the normal coordinate position CGP12, namely, the phase variation information of the channel estimated value that is obtained from the first pilot symbol group is $\Delta\theta3$, and the phase variation information between the coordinate position CGP2 of the received second pilot symbol group and the normal coordinate position CGP12, namely, the phase variation information of the channel estimated value that is obtained from the second pilot symbol group is $\Delta\theta4$. Accordingly, as a result, an absolute value of the phase difference between the first and second pilot symbol groups of the above-mentioned respective slots is $|\Delta\theta3-\Delta\theta4|$ and a code of the phase difference represents negative. Thus, the phase difference measuring unit 10 may obtain the phase difference information of the channel estimated value that is obtained from each pilot symbol group between the slots.

Further, since the phase difference measuring unit 10 obtains the phase difference information by using the phase variation information of each channel estimated value in each finger processing unit of an essential function as a receiver in the DS-CDMA system, the size of the path timing difference measuring unit 12 is not increased from the aspect of a circuit and control.

Further, since the received signal of the above-mentioned downlink DPCH includes interference of the other user and the thermal noise, the above-described phase difference measuring unit 10 may weight the phase difference information by adding reliability information corresponding to the SIR that is measured by the above-mentioned SIR measuring unit 11 to the above-mentioned phase difference information. This weighted phase difference information will be sent to the frequency error detecting unit 15.

The frequency error detecting unit 15 will detect a frequency error by using the phase difference information supplied from the above-described phase difference measuring unit 10 and the path timing difference information supplied from the above-described path timing difference measuring unit 12.

Generally speaking, unless the channel estimated value due to the pilot symbol, namely, the absolute value of the phase difference obtained from the phase difference information is within 180 degrees, it is not possible to detect if the phase is deviated in a positive direction or a negative direction.

In addition, it can be said that the phase difference information between the pilot symbols within the above-mentioned slot from among the phase difference information obtained by the above-described phase difference measuring unit 10 is the information capable of detecting the phase difference correctly with respect to the large frequency error. In other words, taking the above-described example shown in FIG. 6, if $|\Delta\theta1-\Delta\theta2|/T$ symbol is calculated according to the above-mentioned equation (1) by using the absolute value $|\Delta\theta1-\Delta\theta2|$ of the phase difference between the first and second pilot symbols within the slot, it is possible to estimate the large frequency error (namely, the relative moving speed). Herein, "T symbol" means a symbol frequency.

In the similar way, it can be said that the phase difference information between the pilot symbols within the above-mentioned slot from among the phase difference information obtained by the above-described phase difference measuring unit 10 is the information capable of detecting the phase difference correctly with respect to the minute frequency error. In other words, taking the example shown in FIG. 7, if $|\Delta\theta3-\Delta\theta4|/T$ slot is calculated according to the above-mentioned equation (1) by using the absolute value $|\Delta\theta3-\Delta\theta4|$ of the phase difference between respective pilot symbol groups in each slot, it is possible to estimate the minute frequency error (namely, the relative moving speed). Herein, "T slot" means a slot frequency.

Thus, the frequency error detecting unit 15 according to the present embodiment uses the phase difference information between the pilot symbols within the slot for detecting the large frequency error and uses the phase difference information between the pilot symbol groups in each slot for detecting the minute frequency error so as to detect the frequency error from these phase difference information and the above-mentioned path timing difference information.

In this case, as described above, the above-mentioned path timing difference information is generated from the P-CPICH (S-CPICH), and the phase difference information is generated from the downlink DPCH. On the other hand, according to the DS-CDMA system, in order to increase a user capacity in the downlink in the future, it is considered to control directional characteristics by an adaptive array antenna at the base station side. In this case, in the P-CPICH that is regularly transmitted in all directions of a cell (sector) and in the downlink DPCH, of which directional characteristics are controlled, a propagation condition of a channel may be different. Accordingly, according to the preset embodiment, by using two kinds of information, namely, the path timing difference information by using the P-CPICH (S-CPICH) and the phase difference information by using the pilot symbol of the downlink DPCH, it is possible to detect the frequency error with a high degree of accuracy.

In addition, according to the present embodiment, as described above, the reliability information is added to the path timing information and the phase difference information, respectively, and this reliability information is used for detecting the frequency error with a higher degree of accuracy. In other words, as an example, the frequency error detecting unit 15 compares the reliability information added to the phase difference information from the phase difference measuring unit 10 with the reliability information added to the path timing difference information from the path timing difference measuring unit 12 so as to detect the frequency difference. Alternatively, using, for example, the reliability information added to the phase difference information from the phase difference measuring unit 10 and the reliability information added to the path timing difference information from the path timing difference measuring unit 12 as weight, and combining these phase difference information and timing difference information in the maximum ratio, the frequency error detecting unit 15 may detect the frequency error from the information after combining in the maximum ratio.

As described above, the information of the frequency error that is detected by the above-mentioned frequency error detecting unit 15 is sent to an average processing unit 17 and a calculating unit 18.

The average processing unit 17 averages the above-mentioned frequency error. The information of the frequency error that is averaged by this average processing unit 17 is sent to the calculating unit 18 and a frequency correction amount calculating unit 16. The frequency correction amount calculating unit 16 obtains a frequency correction amount of the portable telephone itself by using the above-described averaged frequency error information. This frequency correction amount information is converted into a control voltage value by a D/A converter 14 to be sent to the VC-TCXO 13. The VC-TCXO 13 is automatically frequency-controlled (AFC) in accordance with the above-described control voltage value. Thus, the frequency of the portable telephone is corrected.

In this case, the averaging processing of the frequency error in the above-described average processing unit 17 is carried out in order to absorb random frequency variation amount to be generated by multipath fading under a mobile communication environment and the averaging processing of the frequency error in the above-described average processing unit 17 corresponds to extraction of a carrier wave offset frequency error amount to be generated between a base station and a mobile station. Further, the average processing unit 17 according to the present embodiment is provided with a function capable of arbitrarily setting an averaged time upon averaging the frequency error information from the frequency error detecting unit 15. A parameter of this averaged time is determined by selecting an optimum value from among a simulation value and experimental results under an actual mobile communication environment so that a frequency correction amount to be used for the above-mentioned AFC operation becomes optimum.

On the other hand, the calculating unit 18 subtracts the current frequency error that is supplied from the above-mentioned frequency error detecting unit 15 from the frequency error after the-above mentioned average processing.

In the other words, this calculating unit 18 may take a difference between the current frequency error that is supplied from the above-mentioned frequency error detecting unit 15 and the frequency error after the-above mentioned average processing. The frequency error information after subtract processing at this calculating unit 18 will be sent to a Doppler frequency detecting unit 19.

The Doppler frequency detecting unit 19 may detect the current Doppler frequency by using the frequency error information from the above-mentioned calculating unit 18. This detected Doppler frequency is outputted through a terminal 37 to be sent to the communication CPU 61 shown in FIG. 1.

According to the above explanation, the portable telephone according to the present embodiment may detect a frequency error of a signal by using a phase difference obtained from each phase variation component of each path and a path timing difference obtained from the delay profile so as to detect a Doppler frequency on the basis of this frequency error. Therefore, the portable telephone according to the present embodiment can detect the current Doppler frequency with a high degree of accuracy, for example, even under a communication environment with a low reception level and a multipath environment. In addition, by using the path search and path selection function of an essential function as a receiver in the DS-CDMA system and a channel estimating function in the finger processing unit, the portable telephone according to the present embodiment obtains a path timing difference and a phase difference, then, detects a frequency error, and further, detects a Doppler frequency. Therefore, without newly adding a complex circuit, the portable telephone according to the present embodiment can detect a Doppler frequency with a high degree of accuracy by a small size of a circuit and a low-cost structure.

Figure 8:
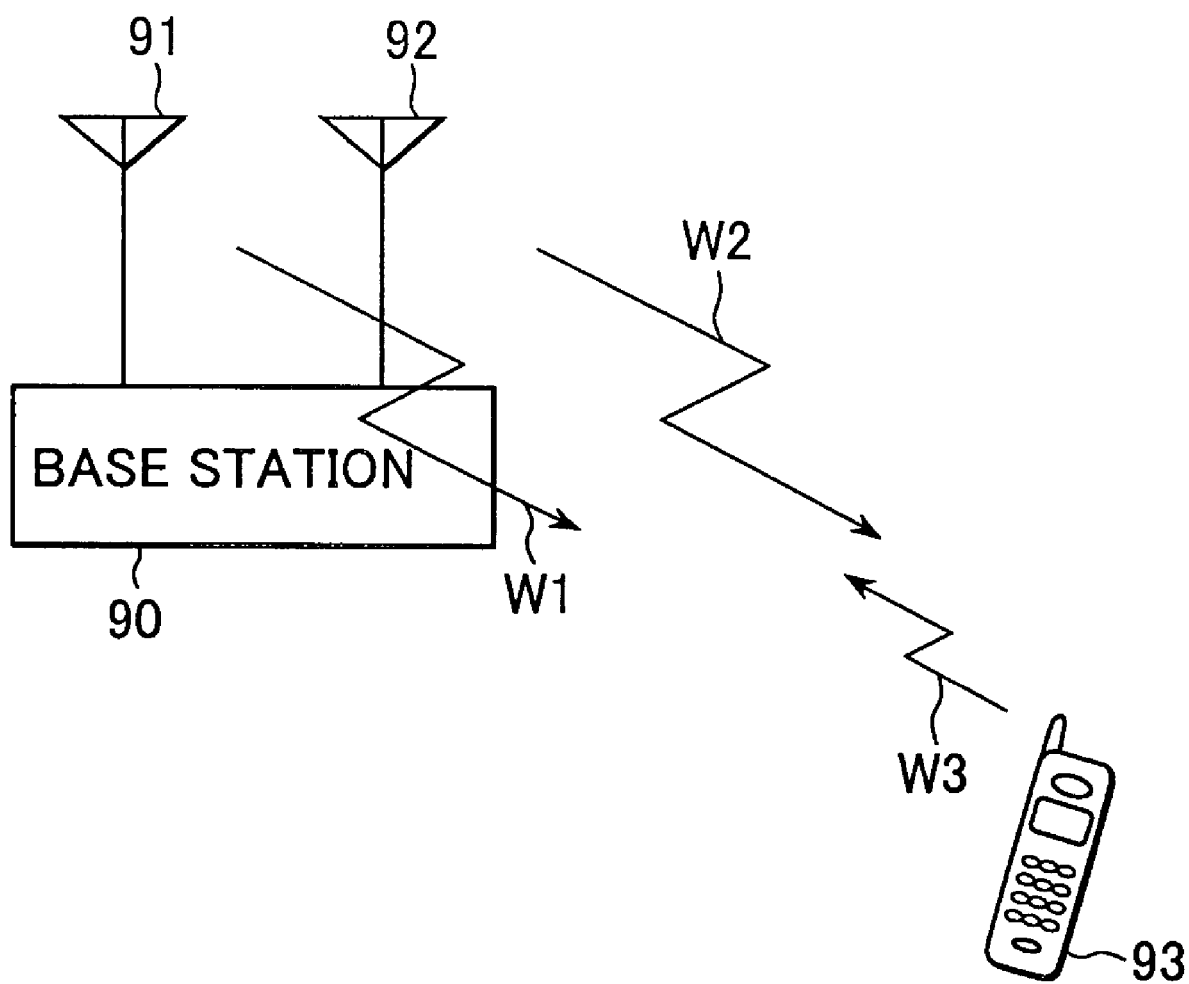
FIG. 8 is a view for showing a schematic structure of a mobile communication system according to an embodiment of the present invention.

Next, FIG. 8 shows a schematic structure of the mobile communication system according to the present invention which includes a mobile station 93 and a base station 90 corresponding thereto. In this FIG. 8, a base station 90 is provided with antennas 91 and 92 or the like for transmission diversity. In addition, the mobile station 93 is the portable telephone according to the present embodiment. Between the above-mentioned base station 90 and the portable telephone according to the present embodiment (the mobile station 93), a radio communication through electric waves W1, W2 and W3 will be carried out.

In this case, as described above, the closed loop transmission diversity has an effect on improvement of the reception property in principle upon moving at a low speed, namely, in a case that a Doppler frequency is small. On the other hand, it is known that the reception property of this closed loop transmission diversity is deteriorated because of reception error of the feedback information at the base station and delay of tracking with respect to variation of a propagation path property upon moving at a high speed, namely, in a case that the Doppler frequency is large.

Therefore, the above-mentioned communication CPU 61 of the portable telephone according to the present embodiment (the mobile station 93) compares the Doppler frequency transmitted from the reception demodulating unit 34 as described above with a given threshold. Then, the communication CPU 61 judges that there is no effect on improvement of the reception property even in the closed loop transmission diversity when the above-mentioned Doppler frequency exceeds this threshold. On the other hand, the communication CPU 61 judges that there is an effect on improvement of the reception property even in the closed loop transmission diversity when the above-mentioned Doppler frequency does not exceed this threshold and then, the communication CPU 61 determines whether or not the closed loop transmission diversity should be carried out in accordance with this judgment result. Further, the above-mentioned threshold is obtained by selecting the optimum value from among a simulation value and experimental results under an actual mobile communication environment.

Then, when an individual channel is established with respect to the base station 90, the communication CPU 61 of the portable telephone according to the present embodiment (the mobile station 93) transmits the above-mentioned determination result information whether or not the closed loop transmission diversity should be carried out to the transmission modulating unit 49 with the determination result information added to a dedicated control channel (DCCH) during uplink communication and then, the communication CPU 61 notifies the base station 90 of this.

Receiving this determination result information, the base station 90 may follow the determination result information transmitted from the above-mentioned mobile station 93 upon judgment whether or not the closed loop transmission diversity should be carried out. In other words, when the determination result information representing that the closed loop transmission diversity should be carried out is transmitted from the mobile station 93, the base station 90 will carry out the closed loop transmission diversity control. On the contrary, when the determination result information representing that the closed loop transmission diversity should not be carried out is transmitted from the mobile station 93, the base station 90 will not carry out the closed loop transmission diversity control but will carry out, for example, the open loop transmission diversity control.

Hereby, this mobile communication system can prevent the deterioration of the reception property by applying the closed loop transmission diversity when the Doppler frequency is large. On the other hand, when the Doppler frequency is small, the mobile communication system can apply the closed loop transmission diversity and can obtain a good reception property.

Further, performing a binary determination, for example, if the Doppler frequency exceeds the threshold, the mobile station 93 may notify the base station 90 of this binary determination result. In this case, it is possible to decrease a communication amount in the dedicated control channel (DCCH) during uplink communication.

Alternatively, without judging whether or not the closed loop transmission diversity should be carried out, the mobile station 93 may notify the base station 90 of a value itself of the above-mentioned detected Doppler frequency by using the dedicated control channel (DCCH) during uplink communication. In this case, the base station 90 judges whether or not the closed loop transmission diversity should be carried out by using this notified value of the Doppler frequency.

After that, receiving from the base station 90 a response that the closed loop transmission diversity control should be carried out, or a response that the closed loop transmission diversity control should not be carried out and, for example, the open loop transmission diversity control should be carried out, the communication CPU 61 of the portable telephone according to the present embodiment optimum-controls the reception property of the reception demodulating unit 34 in accordance with the response.

As described above, according to the present embodiment, the optimum control of the closed loop transmission diversity in accordance with the Doppler frequency is made possible by detecting the current Doppler frequency at the portable telephone (the mobile station 93) side, notifying the side of the base station 90 of the value of the Doppler frequency itself or the information if the closed loop transmission diversity should be carried out by using, for example, the dedicated control channel (DCCH) during uplink communication, and judging whether or not the side of the base station 90 should carry out the closed loop transmission diversity in response to the notified value, and this results in improvement of the reception property.

Further, only one example of the present invention has been explained above as the embodiment. Therefore, it is a matter of course that the present invention is not limited to the above-described embodiment and various modifications will be possible in response to a design or the like without departing from the scope thereof.

According to the present invention, detecting a frequency error of a signal from the phase difference obtained from each phase variation component of each path and a path timing difference obtained from a delay profile, it is possible to detect a Doppler frequency on the basis of this frequency error. Hereby, without newly adding a complex Doppler frequency detection circuit, and even under a communication environment with a low signal level or a multipath environment, it is possible to detect the current Doppler frequency with a high degree of accuracy.

In addition, according to the present invention, detecting the current Doppler frequency at a portable communication terminal and using, for example, a control channel of an uplink, the base station side is notified of the value of the Doppler frequency itself or the information if the closed loop transmission diversity should be carried out. Therefore, the base station can accurately and effectively use the closed loop transmission diversity. Further, since the portable communication terminal optimum-controls the reception property in accordance with a response from the base station side, it is possible to secure a good reception property.

What is claimed is:

1. A circuit for detecting a shifted frequency, comprising:
   a path selection unit for measuring a delay profile of a spread signal that has passed through a plurality of paths, and searching and selecting an optimum path from among said plurality of paths;
   a plurality of finger processing units for reverse spreading the spread signal of each path, which is allocated by said path selection unit, by a spread code replica, obtaining a channel estimated value including at least phase variation component with respect to said path by using a given pilot symbol that is included in the signal after the reverse spread, and carrying out coherent detection by using said channel estimated value;
   a phase difference measuring unit for measuring a phase difference from each phase variation component by each of said finger processing units;
   a path timing difference measuring unit for measuring a periodical path timing difference depending on said delay profile;
   a frequency error detecting unit for detecting a frequency error of said signal by using said path timing difference and said phase difference; and
   a Doppler frequency detecting unit for detecting a Doppler frequency on the basis of said frequency error.

2. The circuit for detecting a shifted frequency according to claim 1, further comprising:
   an average processing unit for averaging the frequency error from said frequency error detecting unit; and
   a calculating unit for obtaining a difference between the frequency error after said averaging and a current frequency error,
   wherein: said Doppler frequency detecting unit generates information representing said Doppler frequency on the basis of the frequency error after said calculation by said calculating unit.

3. The circuit for detecting a shifted frequency according to claim 1, wherein:
   said phase difference measuring unit measures said phase difference by using only a phase variation component from said finger processing unit, to which a path having the maximum signal amplitude is allocated.

4. The circuit for detecting a shifted frequency according to claim 1, wherein:
   said phase difference measuring unit measures said phase difference by using a signal that is obtained by combining said each phase variation component in a maximum ratio corresponding to a signal amplitude of each path, which is allocated to each of said finger processing units.

5. The circuit for detecting a shifted frequency according to claim 1, wherein:
   each slot is provided with a plurality of said pilot symbols;
   said phase difference measuring unit obtains a first phase difference that is measured from a phase variation component between respective pilot symbols within one slot and a second phase difference that is measured from a phase variation component between respective pilot symbol groups within at least two slots; and
   said frequency error detecting unit detects a large frequency error by using said first phase difference and detects a minute frequency error by using said second phase difference.

6. The circuit for detecting a shifted frequency according to claim 1, wherein:
   said path timing difference measuring unit measures said path timing difference by using only a delay profile corresponding to a path having a maximum signal amplitude, which exceeds a given threshold.

7. The circuit for detecting a shifted frequency according to claim 1, wherein:
   said path timing difference measuring unit measures a path timing difference with respect to all paths having a signal amplitude exceeding a given threshold and combining each path timing difference in a maximum ratio corresponding to the signal amplitude of each path.

8. The circuit for detecting a shifted frequency according to claim 1, wherein:
   said path selection unit averages said delay profile by a time period which is arbitrarily settable.

9. The circuit for detecting a shifted frequency according to claim 1, further comprising:
   a combining unit for combining a signal after a coherent detection by each of finger processing units in a maximum ratio; and
   a measuring unit for measuring a signal-to-interference ratio by using said signal combined in the maximum ratio, wherein:
   said phase difference measuring unit generates reliability information of said phase difference by a measured value from said measuring unit to add the reliability information to said phase difference.

10. The circuit for detecting a shifted frequency according to claim 9, wherein:
said path timing difference measuring unit generates reliability information of said measured path timing difference and weights said measured path timing difference by said reliability information.

11. The circuit for detecting a shifted frequency according to claim 10, wherein:
said frequency error detecting unit compares the reliability information added to said phase difference with the reliability information added to said path timing difference and detects a frequency error by using either one of said phase difference and said path timing difference, which has a higher reliability.

12. The circuit for detecting a shifted frequency according to claim 10, wherein:
said frequency error detecting unit combines said phase difference and said path timing difference in the maximum ratio by using the reliability information added to said phase difference and the reliability information added to said path timing difference as weight, respectively, and detects a frequency error from the information after said combining in the maximum ratio.

13. A method for detecting a shifted frequency, comprising the steps of:
measuring a delay profile of a spread signal that has passed through a plurality of paths, and searching and selecting an optimum path from among said plurality of paths;
reverse spreading the spread signal of each path, which is allocated by said path selection, using a spread code replica, and obtaining a channel estimated value including at least phase variation component with respect to said path by using a given pilot symbol that is included in the signal after the reverse spread;
carrying out finger processing to perform coherent detection by using said channel estimated value;
measuring a phase difference from each phase variation component based on each finger processing;
measuring a periodical path timing difference by said delay profile;
detecting a frequency error of said signal by using said path timing difference and said phase difference; and
detecting a Doppler frequency on the basis of said frequency error.

14. The method for detecting a shifted frequency according to claim 13, further comprising the steps of:
averaging said frequency error; and
obtaining a difference between the frequency error after said averaging and a current frequency error, wherein:
upon detecting said Doppler frequency, information representing said Doppler frequency is generated on the basis of the frequency error after obtaining the difference.

15. The method for detecting a shifted frequency according to claim 13, wherein:
upon measuring said phase difference, said phase difference is measured by using only a phase variation component by the finger processing, to which a path having a maximum signal amplitude is allocated.

16. The method for detecting a shifted frequency according to claim 13, wherein:
upon measuring said phase difference, said phase difference is measured by using a signal that is obtained by combining said each phase variation component in a maximum ratio corresponding to a signal amplitude of each path, which is allocated by each of said finger processing.

17. The method for detecting a shifted frequency according to claim 13, wherein:
each slot is provided with a plurality of said pilot symbols, upon measuring the phase difference, a first phase difference that is measured from a phase variation component between respective pilot symbols within one slot and a second phase difference that is measured from a phase variation component between respective pilot symbol groups within at least two slots are obtained, and
upon detecting said frequency error, a large frequency error is obtained by using said first phase difference, and a minute frequency error is obtained by using said second phase difference.

18. The method for detecting a shifted frequency according to claim 13, wherein:
upon measuring said path timing difference, said path timing difference is measured by using only a delay profile corresponding to a path having a maximum signal amplitude, which exceeds a given threshold.

19. The method for detecting a shifted frequency according to claim 13, wherein:
upon measuring said path timing difference, a path timing difference with respect to all paths having a signal amplitude exceeding a given threshold is measured and each path timing difference is combined in a maximum ratio corresponding to the signal amplitude of each path.

20. The method for detecting a shifted frequency according to claim 13, wherein:
upon said path selection, said delay profile is averaged by a time period which is arbitrarily settable.

21. The method for detecting a shifted frequency according to claim 13, further comprising the steps of:
combining a signal after a coherent detection by each of said finger processing in a maximum ratio; and
measuring a signal-to-interference ratio by using said signal combined in the maximum ratio, wherein:
upon measuring said phase difference, reliability information of said phase difference is generated from the measured value of the signal-to-interference ratio to add the reliability information to said phase difference.

22. The method for detecting a shifted frequency according to claim 21, wherein:
upon measuring said path timing difference, reliability information of said measured path timing difference is generated; and said measured path timing difference is weighted depending on said reliability information.

23. The method for detecting a shifted frequency according to claim 22, wherein:
upon detecting said frequency error, the reliability information added to said phase difference is compared with the reliability information added to said path timing difference; and a frequency error is detected by using either one of said phase difference and said path timing difference, which has a higher reliability.

24. The method for detecting a shifted frequency according to claim 22, wherein:
upon detecting said frequency error, said phase difference and said path timing difference are combined in a maximum ratio by using the reliability information added to said phase difference and the reliability information added to said path timing difference as weight, respectively, and a frequency error is detected from the value after being combined at the maximum ratio.

25. A portable communication apparatus having a circuit for detecting a shifted frequency, comprising:
- a transmission and reception circuit for transmitting and receiving a signal that is spread by a spread code to and from a base station;
- a path selection unit for measuring a delay profile of a received signal that has passed through a plurality of paths and has been received, and searching and selecting an optimum path from among said plurality of paths;
- a plurality of finger processing units for reverse spreading a spread signal of each path, which is allocated by said path selection unit, using a spread code replica, obtaining a channel estimated value including at least phase variation component with respect to said path by using a given pilot symbol that is included in the signal after the reverse spread, and carrying out coherent detection by using said channel estimated value;
- a phase difference measuring unit for measuring a phase difference from each phase variation component by each of said finger processing units;
- a path timing difference measuring unit for measuring a periodical path timing difference depending on said delay profile;
- a frequency error detecting unit for detecting a frequency error of said signal by using said path timing difference and said phase difference; and
- a Doppler frequency detecting unit for detecting a Doppler frequency on the basis of said frequency error.

26. A portable communication apparatus, according to claim 25, wherein:
  said path selection unit measures said delay profile by using a signal of a given common control channel as a phase reference for a downlink from the base station.

27. A portable communication apparatus, according to claim 25, wherein:
  said path timing difference measuring unit measures said path timing difference by using a signal of a given common control channel as a phase reference for a downlink from the base station.

28. A portable communication apparatus, according to claim 25, wherein:
  said phase difference measuring unit measures said phase difference from said phase variation component that is obtained from said pilot symbol that is included in a given individual channel of a downlink from the base station.

29. A portable communication apparatus, according to claim 25, further comprising:
  a reference frequency signal generating unit for generating a reference frequency signal to be used upon said transmission and reception; and
  an average processing unit for averaging a frequency error from said frequency error detecting unit; and
  a frequency correction amount calculating unit for generating a correction amount to correct said reference frequency signal from the frequency error after said averaging.

30. A portable communication apparatus, according to claim 29, wherein:
  said average processing unit averages said frequency error by a time period which is arbitrarily settable.

31. A portable communication apparatus, according to claim 25, further comprising:
  a control information generating unit for generating control information to be used for at least control channel of an uplink; and
  a control unit for controlling a transmission and reception property of said transmission and reception circuit, wherein:
  said control information generating unit notifies said base station side of information in accordance with said detected Doppler frequency by inserting the information into a given individual control channel of an uplink, and
  said control unit optimum-controls a reception property of said transmission and reception circuit in response to a reply from the base station corresponding to said notification.

32. A portable communication apparatus, according to claim 25, further comprising:
  a control information generating unit for generating control information to be used for at least an uplink control channel; and
  a control unit for controlling a transmission and reception property of said transmission and reception circuit, wherein:
  said control information generating unit judges whether or not a closed loop transmission diversity should be carried out in accordance with said detected Doppler frequency, notifies said base station side of information in accordance with its detection result by inserting the information into a given individual uplink control channel, and
  said control unit optimally controls a reception property of said transmission and reception circuit in response to a reply from the base station corresponding to said notification.

* * * * *